US012030296B2

(12) United States Patent
Sabanayagam et al.

(10) Patent No.: US 12,030,296 B2
(45) Date of Patent: Jul. 9, 2024

(54) AIRCRAFT LIGHTNING STRIKE PROTECTION

(71) Applicant: The Boeing Company, Chicago, IL (US)

(72) Inventors: Manojkumar Sabanayagam, Karnataka (IN); Harshinder Singh, Karnataka (IN); Mallikarjun Ghasane, Karnataka (IN); Suhasini Lakshmi Darsiv, Karnataka (IN); Ramalakshmi Rajendiran, Chennai (IN); Ameya Deshpande, Maharashtra (IN)

(73) Assignee: THE BOEING COMPANY, Arlington, VA (US)

( * ) Notice: Subject to any disclaimer, the term of this patent is extended or adjusted under 35 U.S.C. 154(b) by 127 days.

(21) Appl. No.: 17/931,969

(22) Filed: Sep. 14, 2022

(65) Prior Publication Data

US 2024/0083138 A1 Mar. 14, 2024

(51) Int. Cl.
*B64D 45/02* (2006.01)
*B32B 5/02* (2006.01)
*B32B 5/26* (2006.01)
*B32B 15/02* (2006.01)
*B32B 15/14* (2006.01)
(Continued)

(52) U.S. Cl.
CPC ............... *B32B 5/26* (2013.01); *B32B 5/02* (2013.01); *B32B 5/028* (2013.01); *B32B 15/02* (2013.01);
(Continued)

(58) Field of Classification Search
CPC .. B32B 5/26; B32B 5/02; B32B 5/028; B32B 15/02; B32B 15/14; B32B 2255/02;
(Continued)

(56) References Cited

U.S. PATENT DOCUMENTS

| 10,758,936 | B2 * | 9/2020 | Braley | .............. B32B 15/14 |
| 2010/0086729 | A1 * | 4/2010 | Long | .............. B32B 15/08 |
| | | | | 428/116 |

(Continued)

FOREIGN PATENT DOCUMENTS

| EP | 2022886 A1 | 2/2009 |
| EP | 2682262 A1 | 1/2014 |

(Continued)

OTHER PUBLICATIONS

Xu et al., "Influence of Carbon Nanotube Aspect Ratio on Normal Stress Differences in Isotactic Polypropylene Nanocomposite Melts," Macromolecules (2008) 41, 815-825.

(Continued)

*Primary Examiner* — Assres H Woldemaryam
(74) *Attorney, Agent, or Firm* — MH2 Technology Law Group LLP

(57) ABSTRACT

A lightning strike protection (LSP) apparatus includes a first layer of fiber glass. The LSP apparatus also includes a second layer positioned on the first layer. The second layer includes carbon nanotubes (CNT). The LSP apparatus also includes a third layer positioned on the second layer. The third layer includes a surfacer. The LSP apparatus also includes a fourth layer positioned on the third layer. The fourth layer also includes the fiber glass. The LSP apparatus also includes a fifth layer positioned on the fourth layer. The fifth layer includes a primer. The LSP apparatus also includes a sixth layer positioned on the fifth layer. The sixth layer includes an outer surface material.

20 Claims, 5 Drawing Sheets

(51) Int. Cl.
*B64C 1/12* (2006.01)
*B64C 3/26* (2006.01)

(52) U.S. Cl.
CPC .............. *B32B 15/14* (2013.01); *B64C 1/12* (2013.01); *B64C 3/26* (2013.01); *B64D 45/02* (2013.01); *B32B 2255/02* (2013.01); *B32B 2255/26* (2013.01); *B32B 2262/101* (2013.01); *B32B 2262/106* (2013.01); *B32B 2307/202* (2013.01); *B32B 2307/302* (2013.01); *B32B 2307/72* (2013.01); *B32B 2307/732* (2013.01); *B32B 2605/18* (2013.01)

(58) Field of Classification Search
CPC .......... B32B 2255/26; B32B 2262/101; B32B 2262/106; B32B 2307/202; B32B 2307/302; B32B 2307/72; B32B 2307/732; B32B 2605/18; B64C 1/12; B64C 3/26; B64D 45/02
See application file for complete search history.

(56) References Cited

U.S. PATENT DOCUMENTS

| 2014/0011414 | A1* | 1/2014 | Kruckenberg | B64C 3/20 |
| | | | | 87/8 |
| 2015/0086768 | A1 | 3/2015 | Hashimoto et al. | |
| 2016/0082691 | A1* | 3/2016 | Restuccia | B32B 5/00 |
| | | | | 442/379 |

FOREIGN PATENT DOCUMENTS

| EP | 3617280 A1 | 3/2020 | |
| EP | 4269653 A2 * | 11/2023 | .......... B29C 53/005 |

OTHER PUBLICATIONS

Extended European Search Report issued Feb. 2, 2024 in corresponding European Application No. 23178791.2, 11 pages.

* cited by examiner

AIRCRAFT LIGHTNING STRIKE PROTECTION

BACKGROUND

When aircrafts are struck by lightning, the result can range from no damage to serious damage that requires extensive repairs that can take the aircraft out of service for an extended period of time. A single bolt of lightning can contain as much as 1 million volts and/or 30,000 amps. The amount and type of damage an aircraft experiences when struck by lightning can vary greatly, depending on factors such as the energy level of the strike, the attachment and exit locations, and the duration of the strike.

The frequency of lightning strikes that an aircraft experiences is affected by several factors, including the geographic area and how often the aircraft passes through takeoff and landing altitudes, which is where lightning activity is most prevalent. Lightning strikes occur most often during the climb and descent phases of flight at an altitude of 5,000 to 15,000 feet. Most lightning strikes occur during the presence of rain. In addition, most lightning strikes to aircrafts occur at near freezing temperatures.

The highest probability for lightning attachment to an aircraft is the outer extremities, such as the wing tip, nose, or rudder. During the initial stages of a lightning strike on an aircraft, a glow can be seen on the on these extremities caused by ionization of the air surrounding the leading edges or sharp points on the aircraft's structure. This ionization is caused by an increase in the electromagnetic field density at those locations.

In the next stage of the strike, a stepped leader can extend off the aircraft from an ionized area seeking the large amount of lightning energy in a nearby cloud. Stepped leaders (also referred to as "leaders") refer to the path of ionized air containing a charge emanating from a charged aircraft or cloud. With the aircraft flying through the charged atmosphere, leaders propagate from the aircraft extremities where ionized areas have formed. Once the leader from the aircraft meets a leader from the cloud, a strike to the ground can continue, and the aircraft becomes part of the event. At this point, passengers and crew may see a flash and hear a loud noise when lightning strikes the aircraft.

After attachment, the aircraft flies through the lightning event. As the strike pulses, the leader reattaches itself to the fuselage or other structure at other locations while the aircraft is in the electric circuit between the cloud regions of opposite polarity. Current travels through the aircraft's conductive exterior skin and structure and exits out another extremity, such as the tail, seeking the opposite polarity or ground.

Aircraft components made of ferromagnetic material can become strongly magnetized when subjected to lightning currents. Large current flowing from the lightning strike in the aircraft structure can cause this magnetization. Lightning can also damage composite aircraft structures if a protection finish is not applied, properly designed, and/or adequate. This damage is often in the form of burnt paint, damaged fiber, and composite layer removal. The composite structures are typically protected with a lightning strike protection (LSP) metal (e.g., copper) mesh. However, what is needed is an improved LSP apparatus that has improved performance and/or decreased weight.

SUMMARY

A lightning strike protection (LSP) apparatus is disclosed. The apparatus includes a first layer of fiber glass. The LSP apparatus also includes a second layer positioned on the first layer. The second layer includes carbon nanotubes (CNT). The LSP apparatus also includes a third layer positioned on the second layer. The third layer includes a surfacer. The LSP apparatus also includes a fourth layer positioned on the third layer. The fourth layer also includes the fiber glass. The LSP apparatus also includes a fifth layer positioned on the fourth layer. The fifth layer includes a primer. The LSP apparatus also includes a sixth layer positioned on the fifth layer. The sixth layer includes an outer surface material such as a paint or printed material.

An aircraft is also disclosed. The aircraft includes a nose. The nose includes a skin made at least partially of a carbon fiber-reinforced polymer (CFRP). The aircraft also includes an engine including the skin made at least partially of the CFRP. The aircraft also includes a wing having a tip that includes the skin made at least partially of the CFRP. The aircraft also includes a lightning strike protection (LSP) apparatus. The LSP apparatus includes a first layer including fiber glass. The first layer is positioned on the skin on the nose, the engine, and the tip of the wing. The LSP apparatus also includes a second layer positioned on the first layer. The second layer has a thickness from about 2.5 μm to about 15 μm. The second layer includes from about 50% to about 100% carbon nanotubes (CNT) by weight or volume. The second layer has an electrical conductivity from about $10^4$ S/cm to about $10^7$ S/cm. The second layer has a thermal conductivity from about 5000 W/mk to about 7000 W/mk. The second layer has a density from about 1.3 gm/cc to about 1.8 gm/cc. An average diameter of the CNTs is from about 0.4 nm to about 40 nm. An average length of the CNTs is from about 0.14 nm to about 55 cm. An aspect ratio of the CNTs is from about 100,000,000:1 to about 132,000,000:1. The LSP apparatus also includes a third layer positioned on the second layer. The third layer includes a surfacer made of a metallic mesh which is optional to use. The LSP apparatus also includes a fourth layer positioned on the third layer. The fourth layer includes the fiber glass. The LSP apparatus also includes a fifth layer positioned on the fourth layer. The fifth layer includes a primer. The LSP apparatus also includes a sixth layer positioned on the fifth layer. The sixth layer includes a CNT fabric.

A method for protecting an aircraft from a lightning strike is also disclosed. The method includes producing a lightning strike protection (LSP) apparatus. The LSP apparatus includes carbon nanotubes (CNTs). The method also includes positioning the LSP apparatus on a composite lay-up.

BRIEF DESCRIPTION OF THE DRAWINGS

The above and/or other aspects and advantages will become more apparent and more readily appreciated from the following detailed description of examples, taken in conjunction with the accompanying drawings, in which.

DETAILED DESCRIPTION

Figure 1:
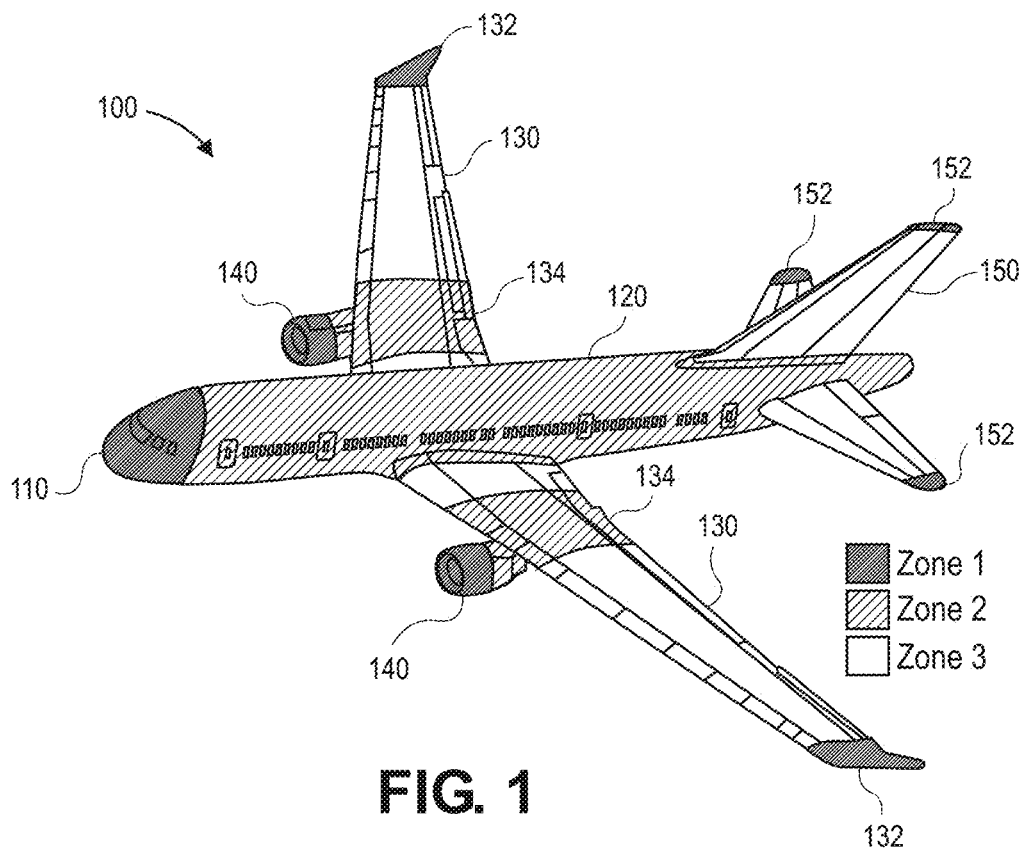
FIG. 1 illustrates a perspective view of an aircraft showing different lightning zones, according to an implementation.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on," "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

In the present disclosure, carbon nano-tube (CNT) fabric with a high aspect ratio is taken as the lightning strike protection layer (LSP) used in composite structures replacing metallic (e.g., copper) mesh to improve the electrical and thermal conductivity during an aircraft lightning strike. The LSP for the composite structures used in the aircraft is concern as lightening damages the composite lay-ups. As mentioned above, one embodiment provides LSP by placing a LSP metallic mesh layer over the composite lay-ups to protect the composite structures which are made of aluminum/copper. As described below, in another embodiment, the LSP may be provided by replacing the copper metal mesh with a high aspect ratio CNT fabric that can provide better performance during the lightning strike with respect to electrical and thermal conductivity compared to the current metal (e.g., copper) mesh with reduced weight. The electrical conductivity of CNT fabric has five times more than the copper metal and thermal conductivity with fifteen times more than the copper. The high aspect ratio CNT fabric provides 84% reduction in weight density compared to copper.

FIG. 1 illustrates a perspective view of an aircraft 100 showing different lightning zones, according to an implementation. In the example shown, the aircraft 100 is an airplane; however, the aircraft 100 can also or instead be a helicopter, an unmanned aerial vehicle (e.g., a drone), or the like. The aircraft 100 can include a nose 110, a fuselage 120, wings 130, engines 140, and a tail 150. The outer surface (e.g., skin) of the nose 110, the tips 132 of the wings 130, the engines 140, the tips 152 of the tail 150, or a combination thereof can be part of a first zone that can be susceptible to lightning damage. For example, the lightning can penetrate and damage the composite structure of the skin. The skin of the fuselage 120 and the engine support 134 of the wings 130 can be part of a second zone that is less susceptible to lighting damage. The skin on the remainder of the wings 130 and the remainder of the tail 150 can be part of a third zone that is even less susceptible to lighting damage.

Figure 2:
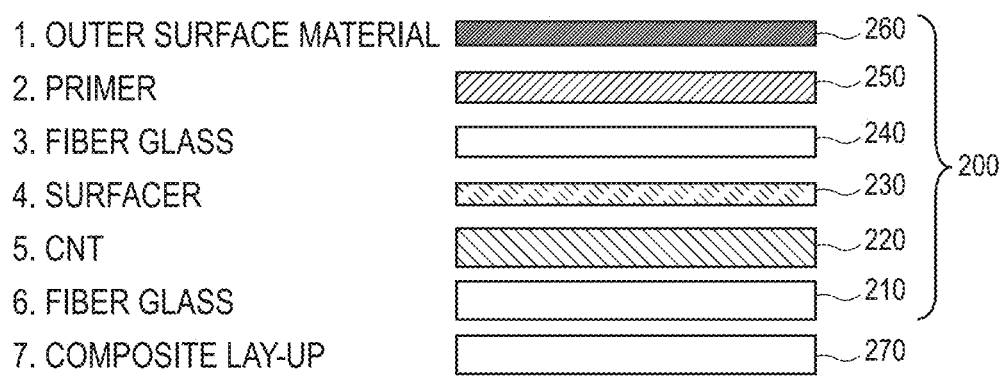
FIG. 2 illustrates a schematic cross-sectional side view of a lightning strike protection (LSP) apparatus, according to an implementation.

FIG. 2 illustrates a schematic cross-sectional side view of a lightning strike protection (LSP) apparatus 200, according to an implementation. The LSP apparatus 200 can include one or more layers (six are shown). A first (e.g., bottom) layer 210 can be or include fiber glass.

A second layer 220 can be positioned at least partially on and/or above the first layer 210. The second layer 220 can be coupled and/or adhered to the first layer 210 using the same matrix layer used for the composite lay-up 270 (described below). The second layer 220 can have a thickness from about 2.5 μm to about 15 μm. In contrast, a conventional copper or aluminum mesh can have a thickness from about 0.25 mm to about 5 mm.

The second layer 220 can be or include carbon nanotubes (CNT). The CNTs can be or include cylindrical molecules that include a hexagonal arrangement of hybridized carbon atoms. The second layer 220 can be or include a fabric and/or mesh that includes the CNT. The second layer 220 can include from about 50% to about 100%, about 70% to about 100%, or about 90% to about 100% CNT (e.g., by volume and/or weight). The diameter of the CNTs can be from about 0.4 nm to about 40 nm. The length of the CNTs can be from about 0.14 nm to about 55 cm. The aspect ratio of the CNTs can be from about 10,000:1 to about 132,000,000:1, from about 100,000:1 to about 132,000,000:1, about 1,000,000:1 to about 132,000,000:1, about 10,000,000:1 to about 132,000,000:1, or about 100,000,000:1 to about 132,000,000:1.

In one implementation, the second layer 220 (and/or one or more other layers in the LSP apparatus 200) can also include metal (e.g., a copper and/or aluminum mesh). In another implementation, neither the second layer 220 nor the other layers in the LSP apparatus 200 can include metal. The second layer 220 (e.g., the CNT therein) can have an electrical conductivity that is about 5 times greater than conventional copper. For example, the second layer 220 can have an electrical conductivity from about $10^4$ S/cm to about $10^7$ S/cm. The second layer 220 (e.g., the CNT therein) can have a thermal conductivity that is about fifteen greater than conventional copper. For example, the second layer 220 can have a thermal conductivity from about 1000 W/mk to about 10,000 W/mk or about 5000 W/mk to about 7000 W/mk. The second layer 220 (e.g., the CNT therein) can have a weight that is about 84% less than conventional copper and about 48% less than conventional aluminum. The second layer 220 (e.g., the CNT therein) can have a density from about 1 gm/cc to about 4 gm/cc or about 1.3 gm/cc to about 1.8 gm/cc.

A third layer 230 can be positioned at least partially on and/or above the second layer 220. The third layer 230 may be or include a surfacer. The surfacer may be made of a metallic mesh.

A fourth layer 240 can be positioned at least partially on and/or above the third layer 230. The fourth layer 240 can be or include a fiber glass. In one implementation, the third layer 230 may be optional and/or omitted, and the fourth layer 240 may be positioned (e.g., directly) at least partially on and/or above the second layer 220.

A fifth layer 250 can be positioned at least partially on and/or above the fourth layer 240. The fifth layer 250 can be or include a primer. The primer may be made of epoxy polyamide with strontium chromate.

A sixth (e.g., top) layer 260 can be positioned at least partially on and/or above the fifth layer 250. The sixth layer 260 can be or include an outer surface material such as a paint or printed material (e.g., 3D printed material from a 3D printer).

The LSP apparatus 200 (e.g., the first layer 210) can be positioned at least partially on/above a base material (referred to below as a composite lay-up) 270. For example, the LSP apparatus 200 (e.g., the first layer 210) can be coupled or adhered to the composite lay-up 270 using the same matrix used for composite lay-up material 210. The composite lay-up 270 can be or include the outer surface (e.g., skin) of the aircraft 100, which can be made at least partially of a metal, a composite, or a combination thereof. In one example, the composite lay-up 270 can be or include a composite material that is in the first zone of the aircraft 100 (e.g., the nose 110, the tips 132 of the wings 130, the engines 140, and/or the tips 152 of the tail 150). The composite material can be or include a carbon fiber-reinforced polymer (CFRP).

Figure 3A:
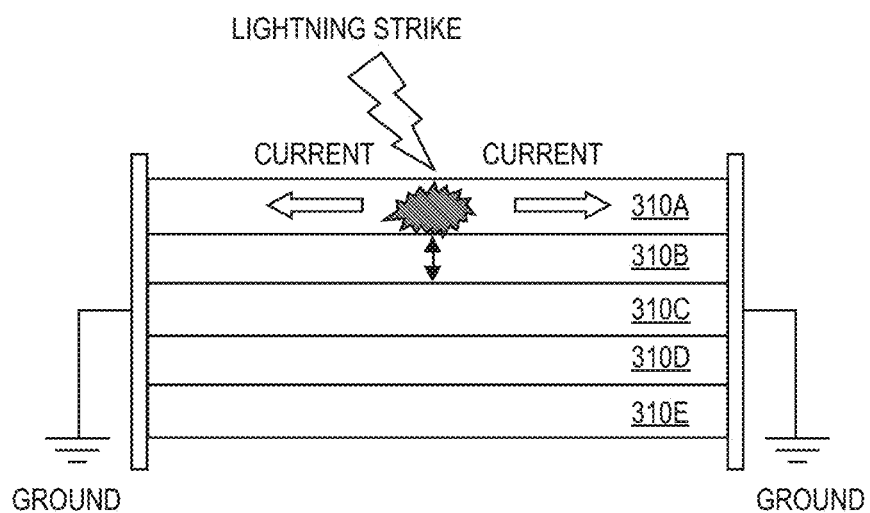
FIG. 3A illustrates a schematic view of a lightning strike test being performed on a plurality of composite laminated layers, according to an implementation.

FIG. 3A illustrates a schematic view of a lightning strike test being performed on a plurality of composite laminated layers 310A-310E (e.g., without any protective layer(s)), according to an implementation. The composite laminated layers 310A-310E can be stacked on one another. The composite laminated layers 310A-310E can be grounded. As can be seen, a majority of the electrical current and/or voltage from the lightning strike can remain within the top layer 310A, rather than dissipating into the other layers 310B-310E. The lightning strike test may be conducted with maximum voltage of 50 kV. For example, the voltage may be from about 10 kV to about 20 kV, about 20 kV to about 30 kV, about 30 kV to about 40 kV, or about 40 kV to about 50 kV.

Figure 3B:
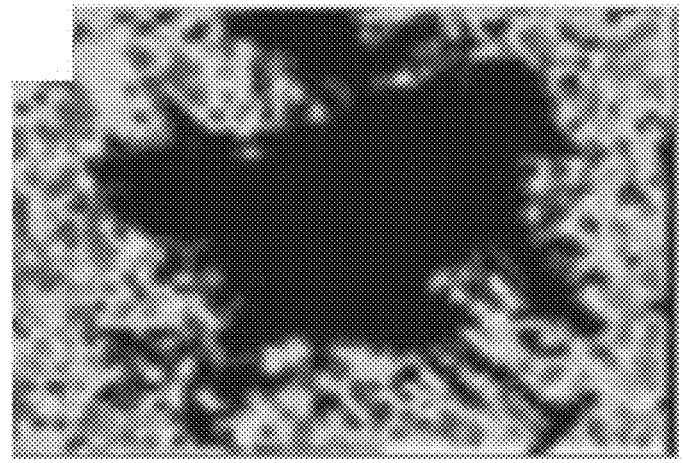
FIG. 3B illustrates a scanning electron microscope (SEM) image showing the composite laminated layers after the lightning strike, according to an implementation.
Figure 3C:
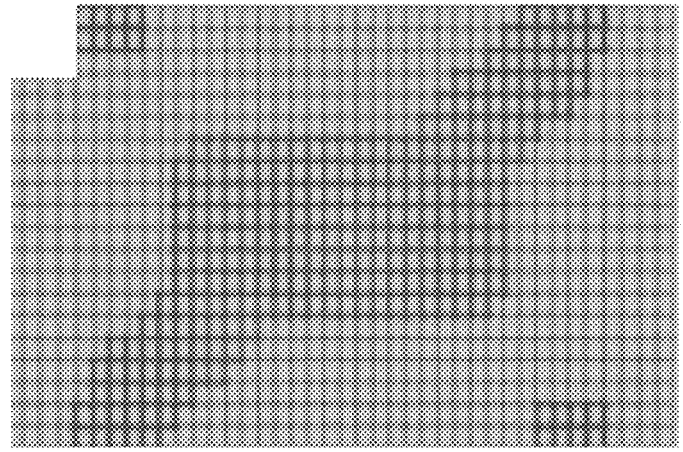
FIG. 3C illustrates an image showing the area of damage caused to the composite laminated layers by the lightning strike, according to an implementation.

FIG. 3B illustrates a scanning electron microscope (SEM) image showing the composite laminated layers 310A-310E after the lightning strike, and FIG. 3C illustrates an image showing the area of damage caused to the composite laminated layers by the lightning strike, according to an implementation. Based on the observations of the damage area shown in FIGS. 4C and 5C, the composite lay-up protected with the CNT fabric in FIG. 5C has about 0.5 times lesser area damage compared to the silver coated composite-layup damage in FIG. 4C.

Figure 4A:
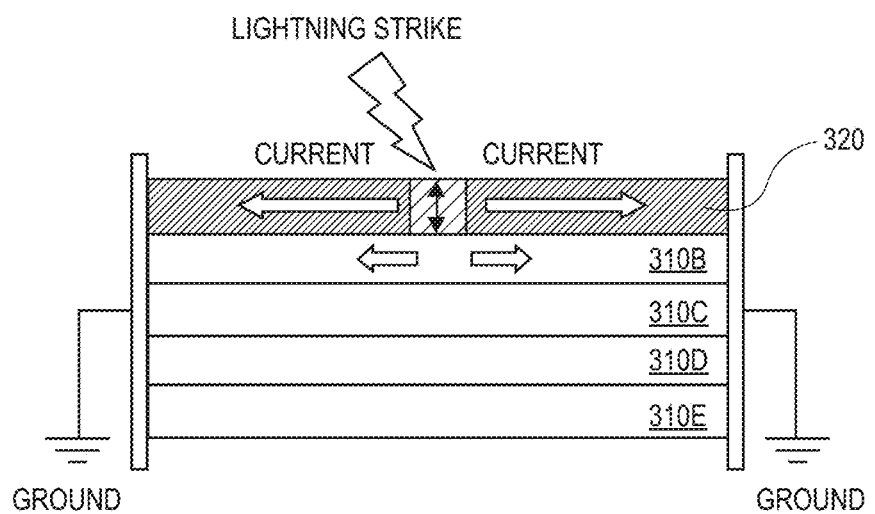
FIG. 4A illustrates a schematic view of a lightning strike test being performed on a plurality of composite laminated layers with a silver layer thereon, according to an implementation.

FIG. 4A illustrates a schematic view of a lightning strike test being performed on a plurality of composite laminated layers 310B-310E with a silver layer 320 positioned thereon, according to an implementation. The silver layer 320 can be positioned on and/or above the top composite laminated layer 310B. The silver layer 320 and the composite laminated layers 310B—310E can be grounded. As can be seen, a portion of the electrical current and/or voltage from the lightning strike can flow from the silver layer 320 into the layer 310B, which can spread the current and/or voltage and reduce the damage therefrom.

Figure 4B:
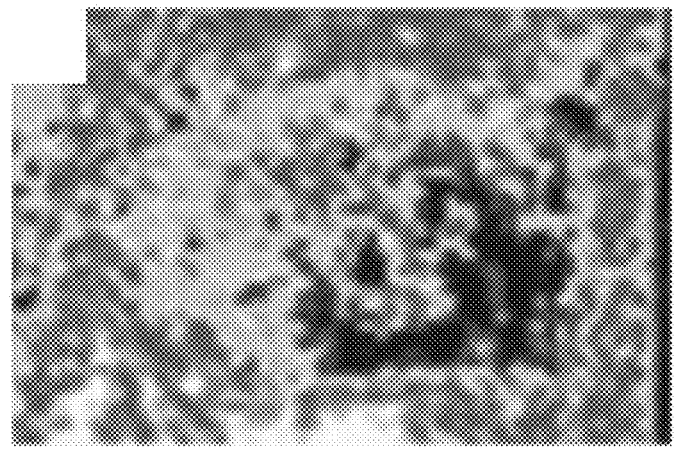
FIG. 4B illustrates a SEM image showing the composite laminated layers with the silver layer after the lightning strike, according to an implementation.
Figure 4C:
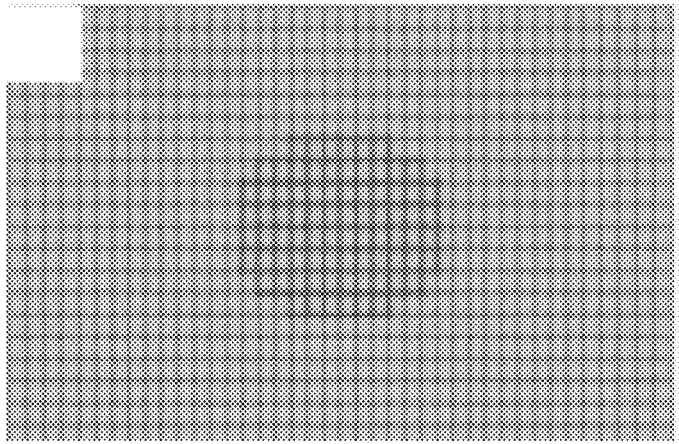
FIG. 4C illustrates an image showing the area of damage caused to the composite laminated layers with the silver layer by the lightning strike, according to an implementation.

FIG. 4B illustrates a SEM image showing the composite laminated layers 310B-310E with the silver layer 320 after the lightning strike, and FIG. 4C illustrates an image showing the area of damage caused to the composite laminated layers 310B-310E with the silver layer 320 by the lightning strike, according to an implementation. As can be seen in FIGS. 4B and 4C, the silver layer 320 reduces the severity and area of damage from the lightning strike (when compared to FIGS. 3B and 3C).

Figure 5A:
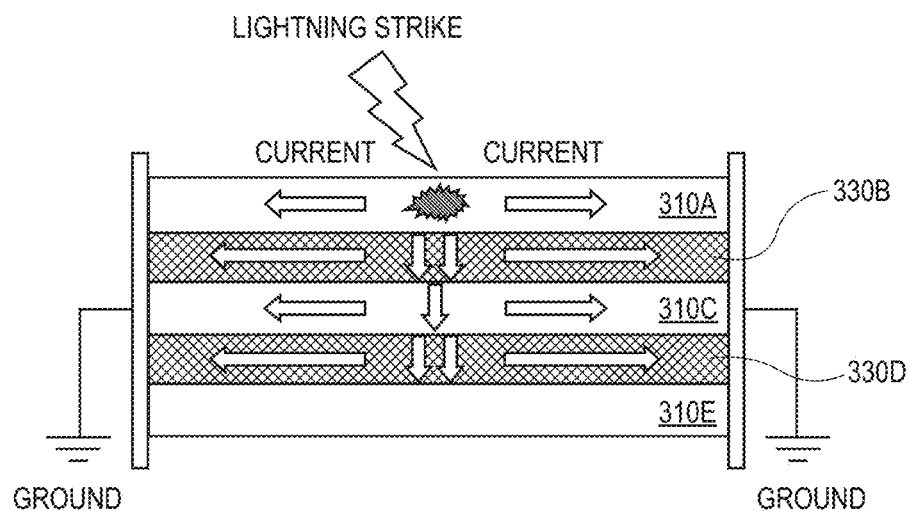
FIG. 5A illustrates a schematic view of a lightning strike test being performed on a plurality of alternating composite laminated layers and carbon nanotube (CNT) layers, according to an implementation.

FIG. 5A illustrates a schematic view of a lightning strike test being performed on a plurality of alternating composite laminated layers 310A, 310C, 310E and CNT layers 330B, 330D, according to an implementation. The composite laminated layers 310A, 310C, 310E and the CNT layers 330B, 330D can be grounded. As can be seen, a portion of the electrical current and/or voltage from the lightning strike can flow from the composite laminated layer 310A into the CNT layer 330B to the composite laminated layer 310C to the CNT layer 330D, which can spread the current and/or voltage and reduce the damage therefrom (e.g., more so than the examples in FIGS. 3A and 4A).

Figure 5B:
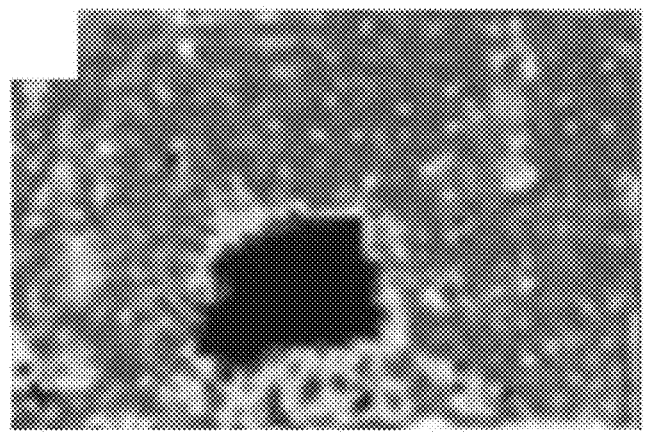
FIG. 5B illustrates a SEM image showing the composite laminated layers and CNT layers after the lightning strike, according to an implementation.
Figure 5C:
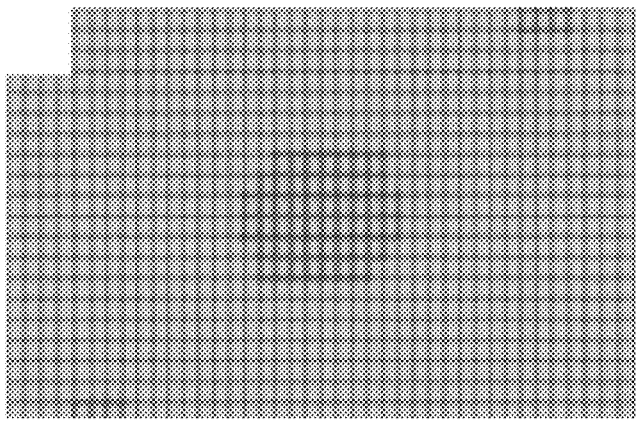
FIG. 5C illustrates an image showing the area of damage caused to the composite laminated layers and CNT layers by the lightning strike, according to an implementation.

FIG. 5B illustrates a SEM image showing the composite laminated layers and carbon nanotube layers after the lightning strike, FIG. 5C illustrates an image showing the area of damage caused to the composite laminated layers and carbon nanotube layers by the lightning strike, according to an implementation. As can be seen in FIGS. 5B and 5C, the CNT layers 330B, 330D reduce the severity and area of damage from the lightning strike (when compared to FIGS. 3B and 3C and/or FIGS. 4B and 4C).

The high aspect ratio CNTs are proven to be lighter and have better electrical and thermal properties than copper and can be a replaceable material to the LSP layer used for composite structures. The challenge in using high aspect ratio CNT fabric is being its manufacturing feasibility and cost. It requires skilled manufacturing equipment and tools to produce high aspect ratio, and the producibility is also considered to be expensive. The substitution of CNTs for the copper metallic mesh has better electrical and thermal properties but the durability of the CNT fabric is less compared to the copper. As such, it may be replaced after certain flight hours based on its durability.

Figure 6:
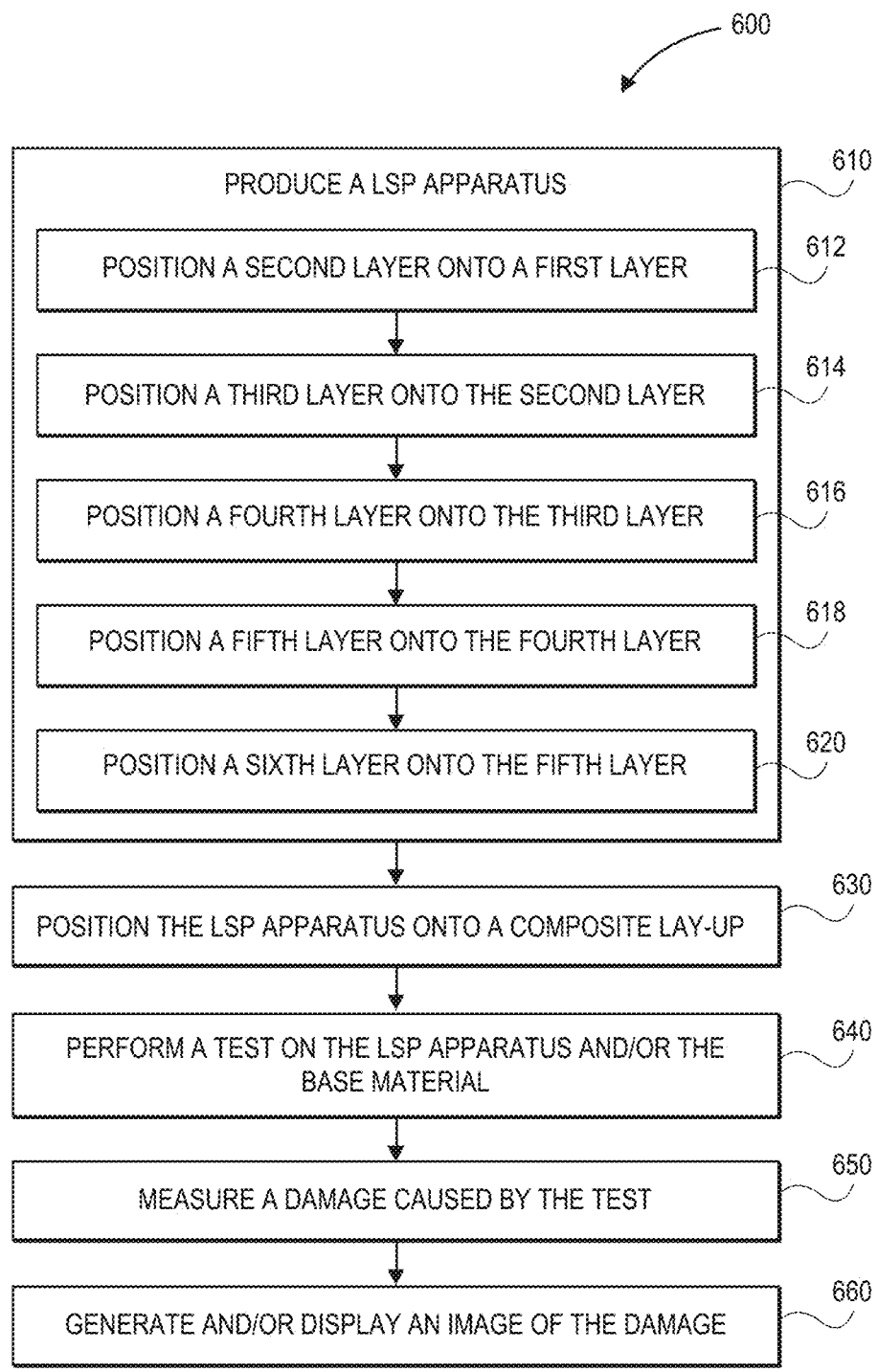
FIG. 6 illustrates a flowchart of a method for providing LSP, according to an implementation.

FIG. 6 illustrates a flowchart of a method 600 for providing LSP (e.g., to the aircraft 100), according to an implementation. An illustrative order of the method 600 is provided below. However, one or more steps of the method 600 can be performed in a different order, combined, split into sub-steps, repeated, or omitted.

The method 600 can include producing a LSP apparatus 200, as at 610. Producing the LSP apparatus 200 can include positioning a second layer 220 onto a first layer 210, as at 612. As mentioned above, the first layer 210 can be or include fiber glass, and the second layer 220 can be or include CNTs. The second layer 220 can be or include a roll of CNT fabric.

Producing the LSP apparatus 200 can also include positioning a third layer 230 onto the second layer 220, as at 614. As mentioned above, the third layer 230 can be or include a surfacer. Producing the LSP apparatus 200 can also include positioning a fourth layer 240 onto the third layer 220, as at 616. As mentioned above, the fourth layer 240 can be or include fiber glass. Producing the LSP apparatus 200 can also include positioning a fifth layer 250 onto the fourth layer 240, as at 618. As mentioned above, the fifth layer 250 can be or include a primer. Producing the LSP apparatus 200 can also include positioning a sixth layer 260 onto the fifth layer 220, as at 620. As mentioned above, the sixth layer 260 can be or include an outer surface material such as a paint or printed material.

The method 600 can also include positioning the LSP apparatus 200 onto a composite lay-up 270, as at 630. As mentioned above, the composite lay-up 270 can be or include an aircraft (e.g., an airplane) 100. More particularly, the composite lay-up 270 can be or include a composite material in the first zone of the airplane 100. In another implementation, the composite lay-up 270 can be part of a testing setup (e.g., as in FIGS. 3A, 4A, and 5A).

The method 600 can also include performing a test on the LSP apparatus 200 and/or the composite lay-up 270, as at 640. The test can be or include exposing the LSP apparatus 200 and/or the composite lay-up 270 to an electrical current and/or voltage that is similar to that of a lightning strike.

The method 600 can also include measuring a damage caused by the test, as at 650. This can include measuring the damage to the LSP apparatus 200 and/or the composite lay-up 270. More particularly, this can include measuring the surface area of the damage in one or more of the layers of the LSP apparatus 200 and/or the composite lay-up 270. This can also or instead include measuring the volume of the damage (e.g., as the damage extends downward through the different layers of the LSP apparatus 200 and/or the composite lay-up 270). This can also or instead include measuring the severity of the damage to the LSP apparatus 200 and/or the composite lay-up 270. The severity of the damage can be measured with respect to its area (e.g., in $m^2/in^2$).

The method 600 can also include generating and/or displaying an image of the damage, as at 660. Examples of images are shown in FIGS. 5B and 5C.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. An aircraft skin lightning strike protection (LSP) apparatus, comprising:
    a first layer comprising fiber glass;
    a second layer positioned on the first layer, wherein the second layer comprises carbon nanotubes (CNT);
    a third layer positioned on the second layer, wherein the third layer comprises a metallic mesh;
    a fourth layer positioned on the third layer, wherein the fourth layer comprises the fiber glass;
    a fifth layer positioned on the fourth layer, wherein the fifth layer comprises a primer; and
    a sixth layer positioned on the fifth layer, wherein the sixth layer comprises an outer surface material.

2. The aircraft skin LSP apparatus of claim 1, further comprising a skin of an aircraft, wherein the first layer is positioned on the skin of the aircraft.

3. The aircraft skin LSP apparatus of claim 2, wherein the first layer is adhered to the skin of the aircraft, and wherein the skin is located on a nose of the aircraft, an engine of the aircraft, a tip of a wing of the aircraft, or a combination thereof.

4. The aircraft skin LSP apparatus of claim 3, wherein the skin comprises a composite material.

5. The aircraft skin LSP apparatus of claim 1, wherein the second layer does not comprise a metal.

6. The aircraft skin LSP apparatus of claim 1, wherein the CNT make up from about 50% to about 100% of the second layer by weight or volume.

7. The aircraft skin LSP apparatus of claim 1, wherein the second layer has a thickness from about 2.5 μm to about 15 μm.

8. The aircraft skin LSP apparatus of claim 1, wherein the second layer has an electrical conductivity from about $10^4$ S/cm to about $10^7$ S/cm, and wherein the second layer has a thermal conductivity from about 1000 W/mk to about 10,000 W/mk.

9. The aircraft skin LSP apparatus of claim 1, wherein the second layer has a density from about 1.3 gm/cc to about 1.8 gm/cc.

10. The aircraft skin LSP apparatus of claim 1, wherein the second layer has an aspect ratio from about 100, 000:1 to about 132,000,000:1.

11. An aircraft, comprising:
    a nose comprising a skin made at least partially of a carbon fiber-reinforced polymer (CFRP);
    an engine comprising the skin made at least partially of the CFRP;
    a wing having a tip that comprises the skin made at least partially of the CFRP; and
    a lightning strike protection (LSP) apparatus comprising:
        a first layer comprising fiber glass, wherein the first layer is positioned on the skin on the nose, the engine, and the tip of the wing;
        a second layer positioned on the first layer, wherein the second layer has a thickness from about 2.5 μm to about 15 μm, wherein the second layer comprises from about 50% to about 100% carbon nanotubes (CNT) by weight or volume, wherein the second layer has an electrical conductivity from about $10^4$ S/cm to about $10^7$ S/cm, wherein the second layer has a thermal conductivity from about 5000 W/mk to about 7000 W/mk, wherein the second layer has a density from about 1.3 gm/cc to about 1.8 gm/cc, wherein an average diameter of the CNTs is from about 0.4 nm to about 40 nm, wherein an average length of the CNTs is from about 0.14 nm to about 55 cm, and wherein an aspect ratio of the CNTs is from about 100,000,000:1 to about 132,000,000:1;

a third layer positioned on the second layer, wherein the third layer comprises a metallic mesh;

a fourth layer positioned on the third layer, wherein the fourth layer comprises the fiber glass;

a fifth layer positioned on the fourth layer, wherein the fifth layer comprises a primer; and a sixth layer positioned on the fifth layer, wherein the sixth layer comprises a paint or 3D-printed material, wherein none of the layers of the LSP apparatus comprise metal.

12. The aircraft of claim 11, wherein the second layer comprises a fabric.

13. The aircraft of claim 11, wherein the second layer comprises a mesh.

14. The aircraft of claim 11, wherein the first layer is adhered to the skin.

15. The aircraft of claim 11, wherein the second layer is adhered to the first layer and the third layer.

16. A method for protecting an aircraft from a lightning strike, the method comprising:

producing an aircraft skin lightning strike protection (LSP) apparatus, wherein the aircraft skin LSP apparatus comprises:

a first layer comprising fiber glass;

a second layer positioned on the first layer, wherein the second layer comprises carbon nanotubes (CNTs);

a third layer positioned on the second layer, wherein the third layer comprises a metallic mesh;

a fourth layer positioned on the third layer, wherein the fourth layer comprises the fiber glass;

a fifth layer positioned on the fourth layer, wherein the fifth layer comprises a primer; and a sixth layer positioned on the fifth layer, wherein the sixth layer comprises an outer surface material; and positioning the aircraft skin LSP apparatus on a composite lay-up.

17. The method of claim 16, wherein the composite lay-up comprises an outer surface of a portion of an aircraft, wherein the portion comprises a nose, an engine, a tip of a wing, or a combination thereof.

18. The method of claim 17, wherein the portion does not comprise a fuselage or a tail of the aircraft.

19. The method of claim 16, further comprising:

performing a lightning strike simulation test on the aircraft skin LSP apparatus, the composite lay-up, or both;

measuring a damage caused by the test to the aircraft skin LSP apparatus, the composite lay-up, or both; and generating an image that shows the damage.

20. The method of claim 19, wherein the damage comprises a surface area of the damage, a volume of the damage through different stacked layers of the aircraft skin LSP apparatus, a severity of the damage, or a combination thereof.

* * * * *